United States Patent
Sweeney et al.

(10) Patent No.: US 6,874,282 B1
(45) Date of Patent: Apr. 5, 2005

(54) SURFACE-SHIELDING SYSTEM FOR USING A HAZARDOUS APPARATUS

(75) Inventors: Jeff S. Sweeney, Atlanta, GA (US); Raymond E. Shelor, Marietta, GA (US)

(73) Assignee: Diversitech Corporation, Decatur, GA (US)

( * ) Notice: Subject to any disclaimer, the term of this patent is extended or adjusted under 35 U.S.C. 154(b) by 222 days.

(21) Appl. No.: 10/192,748

(22) Filed: Jul. 10, 2002

Related U.S. Application Data

(62) Division of application No. 09/343,816, filed on Jun. 30, 1999, now abandoned.

(51) Int. Cl.$^7$ .............................................. B62D 63/04
(52) U.S. Cl. .................. 52/3; 52/4; 428/36.1; 428/122; 428/221; 428/297.4; 442/101; 442/118; 442/126; 442/131; 442/333; 442/402; 442/407
(58) Field of Search ...................... 428/63, 66.6, 66.7, 428/70, 74, 155, 163, 166, 167, 171, 294.7, 542.8, 543, 907, 908.8, 913, 420, 921, 36.1, 36.91, 122, 130, 131, 132, 134–140, 221, 297.4, 102, 299.7; 442/50, 58, 76, 79, 85, 86, 91, 123, 124, 125, 136, 164, 170, 171, 172, 270, 327, 374, 375, 381, 383, 386, 387, 388, 414, 51, 54, 57, 68, 101, 118, 126, 131, 333, 402, 407; 52/3, 4; 126/149, 278

(56) References Cited

U.S. PATENT DOCUMENTS

| 4,159,361 A | * | 6/1979 | Schupack | ..................... 442/63 |
| 4,617,219 A | * | 10/1986 | Schupack | .................... 428/113 |
| 6,528,151 B1 | * | 3/2003 | Shah et al. | .................. 428/221 |

* cited by examiner

*Primary Examiner*—Arti R. Singh
(74) *Attorney, Agent, or Firm*—Smith, Gambrell & Russell, LLP

(57) ABSTRACT

A system for utilizing a hazardous apparatus with a pad of fibrous fabric embedded in cement to shield a protectable surface from hazards produced by the hazardous apparatus.

29 Claims, 2 Drawing Sheets

SURFACE-SHIELDING SYSTEM FOR USING A HAZARDOUS APPARATUS

CROSS-REFERENCE TO RELATED APPLICATIONS

This application is a division of application Ser. No. 09/343,816, filed Jun. 30, 1999, now abandoned, which is relied on and incorporated herein by reference.

TECHNICAL FIELD

The present invention relates to a protective layer of a fire resistant material used on decks, patios, and other surfaces, and more particularly relates to a fire resistant fiber-cement composite mat.

BACKGROUND OF THE INVENTION

Barbecuing or grilling in the backyard has always been a popular past time. Many households have a grill, a hibachi, a smoker, or other types of outdoor cooking devices. These devices may burn gas, charcoal, wood, or other types of combustible fuels. These devices may be set up in the backyard, on a patio, a deck, a balcony, or anywhere outside. Also popular are various types of outdoor candles. These candles are used for decorative purposes, for lighting, and also to drive away insects. For example, various types of citronella products, such as pots or torches, may be placed outside on the patio, the deck, or elsewhere. Finally, wood burning warming devices also are becoming popular. For example, devices such as clay or ceramic firepots are used outside on the patio, the deck, or elsewhere.

One of the main attractions and one of the main drawbacks with these outdoor devices is that they generally use an open flame. The use of the open flame can cause problems ranging from a mere nuisance to a tragedy. For example, flames, ashes, or grease may escape from the outdoor device and stain or scorch a patio or a deck, particularly a wooden deck. Further, the flame, ashes, or grease also can set the wooden deck or even the backyard grass on fire. Likewise, the citronella pots and torches, as well as the firepots, also can scorch a deck or even set the deck on fire if accidentally tipped over.

Various types of deck and patio protectors have been used in the past. These known devices generally have been made from stamped metal or from some type of plastic and formed into a shallow box of some sort. The problems with these devices include the fact that the box often retains rain water and may be difficult to clean. The metal devices also tend to rust quickly. Further, the metal or the plastic material generally does not breathe such that any water located between the device and the deck remains trapped. This trapped water also will deteriorate or stain a wooden deck. Finally, it is often difficult to position the cooking device within the box.

What is needed, therefore, is an improved protection device for decks, patios, and other outdoor areas for use with an outdoor cooking device or other outdoor product having an open flame. The device must be fire resistant while also being aesthetically pleasing. Further, the device should protect the deck, the patio, or other surface while also resisting deterioration of the deck because of trapped moisture. Finally, the device should be relatively inexpensive, easy to clean, and easy to move.

SUMMARY OF THE INVENTION

The present invention provides a pad for protecting a surface from a container with a combustion source. The pad includes a cementitious slurry with a fibrous fabric embedded therein. The pad has a thickness of about 0.0625 to about 1.0 inches, with less than about 0.5 inches preferred.

Specific embodiments of the pad include having a periphery with a recess therein such that the recess functions as a handle. The cementitious slurry may include a mixture of portland cement, microsilica, fine sand, water, and water reducing super plastisizer. The fibrous fabric may include polypropylene, specifically a needle-punched non-woven material such as a three dimensional web of lofty, discreet fibers. The fibrous fabric may have a fiber volume of approximately three (3) to twenty percent (20%). Recycled fibers may be used. The fibrous fabric may have a weight of about three (3) to about twelve (12) ounces per square yard and a loft of about 0.050 to about 0.250 inches. A single ten (10) ounce per square yard layer of the fibrous fabric may be used as well as a double five (5) ounce per square yard layer.

The pad may have a weight of about one (1) to about three (3) pounds per square foot with sufficient flexibility to be rolled up into a tube with a diameter of about six (6) inches. The cementitious slurry and the fibrous fabric provide a water vapor permeable and liquid impermeable material. Specifically, the pad may have water vapor permeability of about one (1) to about three (3) grams per hour per square meter. The cementitious slurry and the fibrous fabric provide fire resistance, heat resistance, and scorch resistance. The pad also may have a sand blasted texture or a plurality of channels formed therein.

A further embodiment of the present invention provides for an outdoor surface protection system. The system includes a container with a combustion source and a pad positioned between the outdoor surface and the container. The pad includes a cementitious slurry and a fibrous fabric embedded in the cementitious slurry. The outdoor surface may be a deck or a patio. The container may be a cooking device such as a grill, a barbecue, a hibachi, or a smoker. The container also may include a candle, such as a citronella pot; a firepot; or a fire starter. The pad also may take the shape of a skirt.

A further embodiment of the present invention provides for a deck protection system. The system includes a grill and a pad positioned between the grill and the container. The pad includes a cementitious slurry and a fibrous fabric embedded in the cementitious slurry such that the pad provides flame and heat resistance.

Other objects, features, and advantages of the present invention will become apparent upon review of the following detailed description of the preferred embodiments of the invention, when taken in conjunction with the drawings and the appended claims.

DETAILED DESCRIPTION OF THE INVENTION

Figure 1:
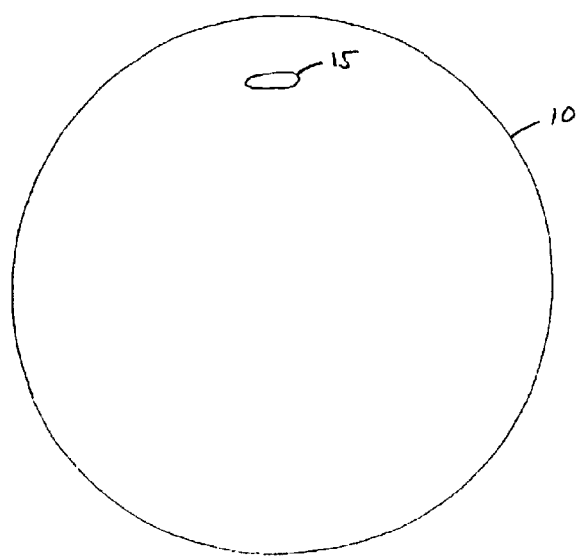
FIG. 1 is a plan view of the protective pad of the present invention.

Referring now to the drawings, in which like numerals represent like parts throughout the several views, FIG. 1 shows a protector pad 10 of the present invention. The protector pad 10 may be made in any convenient size or shape. In the example of FIG. 1, the pad 10 is in the form of a circle. The pad 10 preferably is big enough for an outdoor device to be placed thereon. The pad 10 may have a recess 15 on one end that acts as a handle. The recess 15 preferably is large enough so as to be grasped by hand.

Figure 2:
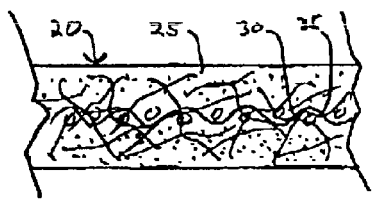
FIG. 2 is a side cross sectional view of the pad of the present invention.
Figure 3:
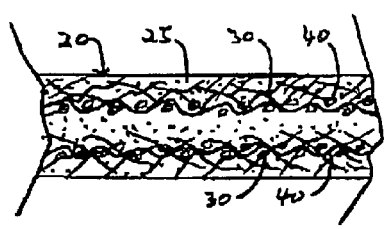
FIG. 3 is a side cross sectional view of an alternative embodiment of the pad of the present invention.

As is shown in FIGS. 2 and 3, the pad 10 may be made from a composite mixture 20. A preferred composite mixture 20 includes a combination of a slurry mixture 25 and one or more fibrous fabrics 30 embedded within the slurry mixture 25. The fibrous fabric 30 provides continuous and uniform three-dimensional re-enforcement throughout the entire thickness of the slurry mixture 25. The slurry mixture 25 provides rigidity while the high fiber volume of the fibrous fabric 30 provides toughness, ductility, and crack resistance.

The slurry mixture 25 is preferably a cementitious mixture, but can include mixtures of concrete, plaster, epoxy, synthetic resins, polymers, paint, or water proofing compounds. Any type of known cementitious slurry can be used, including a preferred mixture of about ten (10) parts portland cement, about one (1) part microsilica, about five (5) parts fine sand, about four (4) parts water, and about 0.1 parts water reducing super plastisizer. By "portland cement", we mean a hydraulic cement made by finely pulverizing a mixture of clay and limestone or similar materials. The proportions of the slurry mixture 25 may vary according to the use of the pad 10, i.e., the proportions described above may be varied according to the desired hardness or size of the pad 10.

The fibrous fabric 30 is preferably a needle-punched polypropylene non-woven material such as a three dimensional web of lofty, discreet polypropylene fibers with a fiber volume of approximately three (3) to twenty percent (20%). Continuous fibers also may be used. Polypropylene is preferred because of its combination of strength, ductility, economy, and chemical resistance. The fibrous fabric 30 may include recycled polypropylene fibers or a combination of virgin and recycled fibers. The fibrous fabric 30 may weigh between about three (3) and about twelve (12) ounces per square yard and may have a loft of about 0.050 and 0.250 inches. Although a three dimensional fabric is preferred, the fibrous fabric 30 can be any type of synthetic or natural fibrous materials, including spunbonded fabrics, mesh, glass mats, or even paper.

As is shown in FIG. 2, a single layer 35 of the fibrous fabric 30 may be used. In this example, the single layer 35 may weigh about ten (10) ounces per square yard. Further, as is shown in FIG. 3, a double layer 40 of the fibrous fabric 30 also may be used. In this case, each layer in the double layer 40 of the fibrous fabric 30 may weigh about five (5) ounces per square yard. The fibrous fabric 30 is embedded into and impregnated by the slurry mixture 25. The fibrous fabric 30 can be applied by hand or by mechanical pressing to insure that the slurry mixture 25 is uniformly distributed throughout the fibrous fabric 30.

The pad 10 may have a thickness of about 0.0625 of an inch to about an inch, with less than about 0.5 inches preferred. The composite mixture 20 weighs about one (1) to about three (3) pounds per square foot with about two (2) pounds per square foot preferred. In the example of FIG. 1, the pad 10 may have a diameter of about three (3) feet and a thickness of about a quarter (0.25) inch. Such a pad 10 would weigh only about twelve (12) pounds. Significantly, such a pad 10 also would have a great amount of flexibility. For example, the pad 10 described herein may have sufficient flexibility to be rolled up into a tube with a diameter of about six (6) inches without breaking or cracking. Further, the pad 10 is useful on uneven surfaces because of its flexibility.

The pad 10 not only has a high degree of flexibility, but the use of the composite mixture 20 also allows the pad 10 to breathe. Any moisture that may be trapped underneath the pad 10 can evaporate. For example, the pad 10 described above may allow about one (1.0) to about three (3.0) grams per hour per square meter of water vapor to pass through. The pad 10, however, is largely water-resistant such that rainwater or other liquids will not pass through the pad 10 to the underlying surface.

Further, the pad 10 also provides a high degree of fire resistance, heat resistance, and scorch resistance because of the use of the slurry mixture 25. The concrete within the slurry mixture 25 is of sufficient hardness so as to resist burning when a flame or other type of combustion or other item falls onto the pad 10 for a short amount of time. Although the pad 10 is flame resistant, the pad 10 is not intended as a refractory insulation. In other words, the pad 10 is not intended as a surface on which an open fire should be built directly thereon.

Finally, the pad 10 is easy to clean. Grease, dirt, or other items that land thereon usually can be cleaned with soap and water. The composite mixture 20 also may be mixed with paint or various types of dyes so as to produce a pad 10 in any given color. This coloration also may help in hiding scorches or imperfection in the material. Further, the pad 10 can be stained or painted after manufacture.

Production of the pads 10 can be done continuously, i.e., the fibrous fabric 30 may be embedded into the slurry mixture 25 to form a pad 10 of infinite length. The pad 10 would then be cut with a flying-type cut off saw (not shown) into pads 10 of predetermined length. Alternatively, the fibrous fabric 30 may be cut to a predetermined size and shape and then the slurry mixture 25 may be added to form the pad 10 with the predetermined size and shape.

Figure 4:
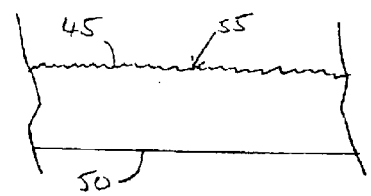
FIG. 4 is a side cross sectional view of the pad of the present invention with a sand blasted surface.
Figure 5:
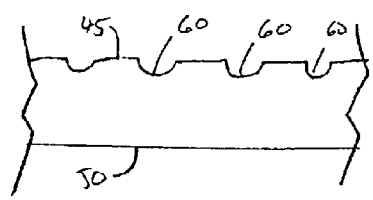
FIG. 5 is a side cross sectional view of the pad of the present invention with channels therein.

As is shown in FIGS. 4 and 5, the pad 10 has an upper surface 45 and a lower surface 50. Either or both surfaces 45, 50 may be textured in any desired manner. For example, in FIG. 4, the upper surface 45 is textured in a sand blasted pattern 55. This sand blasted pattern 55 may provide traction to the pad 10. Further, FIG. 5 shows the upper surface 45 of the pad 10 with a plurality of channels 60 formed therein. The channels 60 may provide drainage or a runway by which to install or to roll the cooking device or other object onto the pad 10.

Figure 6:
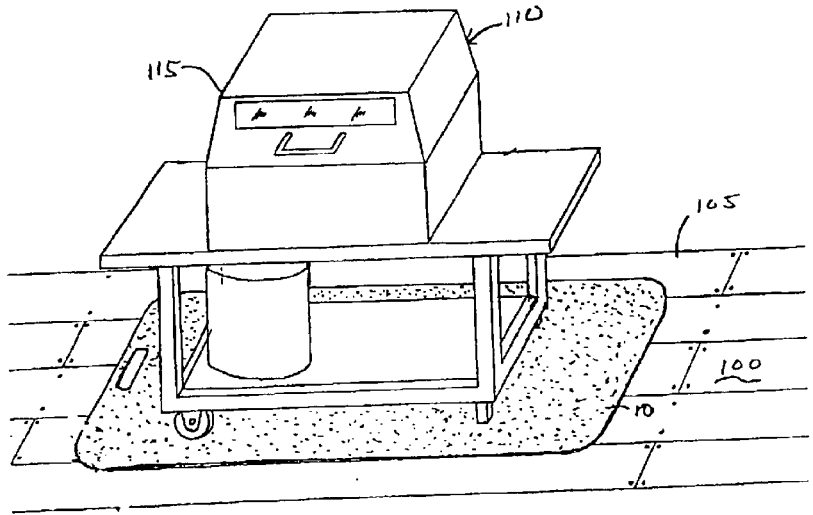
FIG. 6 is a perspective view of the pad of the present invention with a grill on a deck.
Figure 7:
FIG. 7 is a side view of the pad of the present invention in its rolled up form.

In use, the pad 10 is placed on a support surface 100. The support surface 100 may be a deck, a patio, a balcony, the grass, the beach, or any suitable surface. In the example of FIG. 6, a deck 105 is shown. A cooking device 110 is then placed on the pad 10. The cooking device 110 may be a barbecue, a hibachi, a smoker, or any type of device using a flame or heat. In the example of FIG. 6, a grill 115 is shown. The pad 10 protects the deck 105 from sparks, flames, grease, or any other hot or burning items that may come from the grill 115. The composite mixture 20 of the pad 10 is sufficiently fire resistant, heat resistant, and scorch resistant so as to protect the deck 105. After use, the pad 10 may be rolled up as shown in FIG. 7 and stored. The pad 10 is sufficiently lightweight such that it is easily portable.

Figure 8:
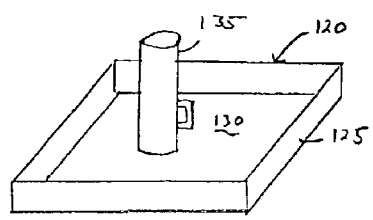
FIG. 8 is a perspective view of an alternative embodiment of the present invention showing a firebox.

FIG. 8 shows an alternative embodiment of the present invention. FIG. 8 shows a grill box 120. The grill box 120 includes an outer frame 125 and a pad insert 130 using the composite mixture 20 of the present invention. The frame 125 may be made from wood or other suitable materials. The pad insert 130 is inserted within the frame 125. The grill box 120 is designed to be attached to the grill 115 or to be located nearby. In this example, a fire starter 135 is placed within the grill box 120. The fire starter 135 may be used to start a fire within the grill 115 and may be extremely hot. Placing the fire starter 135 within the grill box 120 prevents the fire starter 135 from accidentally starting a fire outside the grill 115 or scorching the surrounding area. The grill box 120 also may be used for other holding other types of grill tools and for raw or cooked food.

Figure 9:
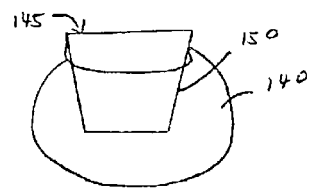
FIG. 9 is a perspective view of an alternative embodiment of the present invention showing a candle pad.

FIG. 9 shows a further alternative embodiment of the present invention. FIG. 9 shows a candle pad 140. The candle pad 140 is made from the same composite mixture 20 materials as the pad 10 described above. In this example, a citronella pot 145 is placed on the candle pad 140. The citronella pot 145 is typically made from a galvanized metal 150. This galvanized metal 150 may become quite hot as the candle within the citronella pot 145 burns down. This hot galvanized metal 150 also may burn or scorch the deck 105 or other type of supporting surface 100. The candle pad 140 is placed beneath the citronella pot 145 and protects the supporting surface 100. The candle pad 140 may have a diameter of only about three (3) or four (4) inches, but can be of any desired size or shape. In addition to the citronella pot 145, the candle pad 140 also can be used for firepots or any other type of outdoor product using a flame. The pad 140 may be sized to fit the object placed thereon.

Figure 10:
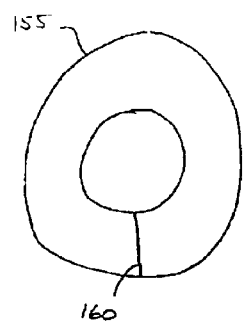
FIG. 10 is a plan view of an alternative embodiment of the present invention showing a skirt pad.

FIG. 10 shows a further alternative embodiment of the present invention. In this embodiment, a skirt 155 is shown. The skirt 155 is made from the same composite mixture 20 material as the pad 10. In this embodiment, the skirt 155 may encircle either a permanently attached structure or may be used simply to encircle a device so as to protect the surrounding support surface 110 from flames or other items that may escape. The skirt 155 may have a slit 160 therethrough such that the skirt 155 may be positioned around the device.

It should be understood that the foregoing relates only to the preferred embodiments of the present invention and that numerous changes may be made herein without departing from the spirit and scope of the invention as defined by the following appended claims.

We claim:

1. A surface-shielding hazardous apparatus utilization system comprising:
   a) a protectable surface;
   b) an apparatus producing hazard to the protectable surface; and
   c) a hand-movable pad contacting and covering the protectable surface and underlying the apparatus, wherein the pad includes fibrous fabric embedded in cement.

2. The system of claim 1, wherein the pad includes portland cement.

3. The system of claim 1, wherein the pad is formed from a mixture of portland cement, microsilica, fine sand, water and water reducing plastisizer.

4. The system of claim 1, wherein the pad includes a handle.

5. The system of claim 1, wherein the fibrous fabric includes propylene.

6. The system of claim 1, wherein the fibrous fabric includes a needle-punched non-woven material.

7. The system of claim 1, wherein the fibrous fabric includes a three dimensional web of lofty, discreet fibers.

8. The system of claim 1, wherein the pad is permeable to vapor and impermeable to liquids.

9. The system of claim 1, wherein the pad includes a sand-blasted texture.

10. The system of claim 1, wherein the pad includes a plurality of channels.

11. The system of claim 1, wherein the apparatus is a combustion source.

12. The system of claim 1, wherein the hazard is selected from the group consisting of sparks, flames, grease and heat.

13. The system of claim 1, wherein the pad includes decorative corking.

14. The system of claim 11, wherein the combustion source includes a cooking device.

15. The system of claim 14, wherein the cooking device is a device selected from the group consisting of a grill, barbeque, hibachi and smoker.

16. The system of claim 11, wherein the combustion source includes a candle.

17. The system of claim 11, wherein the combustion source includes a citronella pot.

18. The system of claim 11, wherein the combustion source includes a firepot.

19. The system of claim 11, wherein the combustion source includes a fire starter.

20. The system of claim 11, wherein the pad comprises a skirt.

21. The system of claim 1, wherein the protectable surface is selected from the group consisting of a deck surface, patio surface, balcony surface, beach surface and grass surface.

22. The system of claim 21, wherein the apparatus is selected from the group consisting of a grill, barbeque, hibachi and smoker.

23. A surface-shielding combustion source utilization system comprising:
   a. a protectable surface;
   b. a combustion source; and
   c. a pad contacting and covering the protectable surface and between the combustion source, wherein the pad includes fibrous fabric embedded in cement.

24. The system of claim 23, wherein the combustion source is an outdoor cooking apparatus.

25. The system of claim 24, wherein the outdoor cooking apparatus is selected from the group consisting of a grill, barbeque, hibachi and smoker.

26. The system of claim 25, wherein the protectable surface is selected from the group consisting of a deck surface, patio surface, and balcony surface.

27. The system of claim 23, wherein the pad is hand-movable.

28. The system of claim 27, wherein the combustion source produces a hazard to the protectable surface, said hazard selected from the group consisting of sparks, flames, heat, and grease.

29. The system of claim 28, wherein the pad is permeable to vapor.

* * * * *